April 18, 1939.    S. T. SCHOFIELD    2,154,533
CIRCUIT INTERRUPTER
Filed May 22, 1937    2 Sheets-Sheet 1
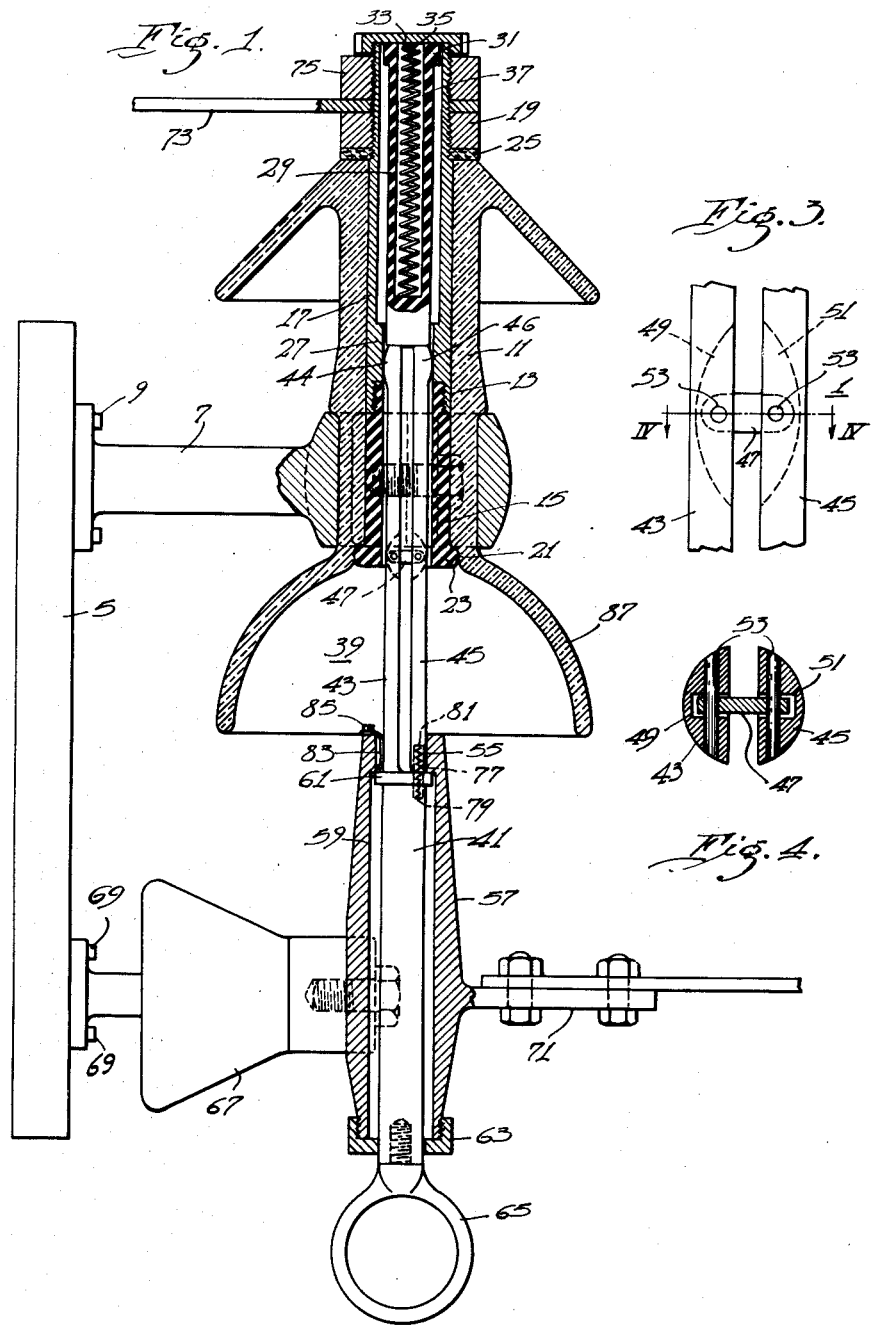
WITNESSES:
INVENTOR
Stanley T. Schofield, Deceased,
By Martha M. Schofield, Administratrix.
BY
ATTORNEY

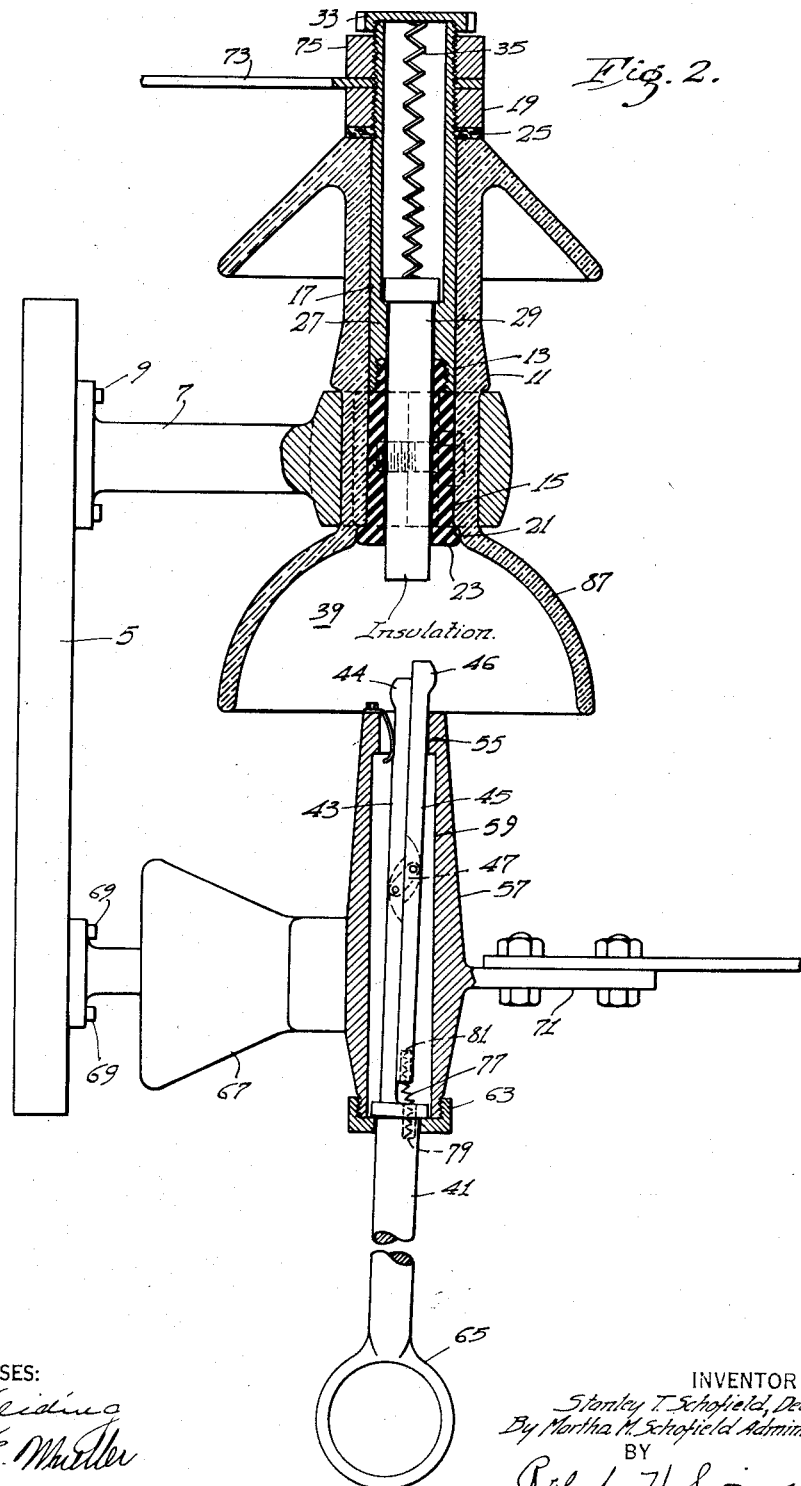

Patented Apr. 18, 1939

2,154,533

UNITED STATES PATENT OFFICE 2,154,533

CIRCUIT INTERRUPTER

Stanley T. Schofield, deceased, late of Wilkinsburg, Pa., by Martha M. Schofield, administratrix, Wilkinsburg, Pa., assignor to Westinghouse Electric & Manufacturing Company, East Pittsburgh, Pa., a corporation of Pennsylvania Application May 22, 1937, Serial No. 144,134

17 Claims. (Cl. 200—48)

This invention relates to circuit interrupters, and more particularly to a combined load current interrupter and disconnect device.

The general practice in the distribution of electrical power is to provide the customer's line with overload protection and means for isolating his load circuit from the supply feeder. Where the continuity of service is of prime importance, the usual switching and protective equipment comprises a disconnect switch and circuit breaker. There are, however, numerous instances where the continuity of service is of minor importance and the revenue derived from the power supplied is insufficient to warrant the cost of installing the usual equipment.

In order to provide adequate protective and switching facilities at a cost which is not prohibitive, this circuit interrupter has been developed which is capable of interrupting load currents and when in the open circuit position provides adequate gap distance between the contacts to effectively isolate the connected circuit from its source of supply. Overload protection may be obtained by the use of a fuse device which may be produced at a relatively low cost.

The main object therefore of this invention is to provide a combined load current interrupter and disconnect device which is simple in construction, reliable in operation and inexpensive to manufacture.

A further and more specific object of this invention is to provide a circuit interrupter having a new and improved contact structure capable of effecting a high contact pressure but which will permit the easy opening and closing of the contact members without undue mechanical resistance.

Other objects and advantages relate to details of the circuit interrupter structure and to the arrangement of the various parts thereof which will appear more fully in the following description taken in connection with the accompanying drawings, in which:

Figure 1 is a side elevational view of the interrupter of my invention shown partially in cross-section, Fig. 2 is a view similar to Fig. 1 with the exception that it shows the interrupter in the open circuit position, Fig. 3 is an enlarged fragmentary view showing details of the contact arrangement, and Fig. 4 is a cross-sectional view taken along the line IV—IV of Fig. 3, showing further details of the contact arrangement.

Referring to the drawings, the reference number 5 designates a base upon which is mounted a bracket 7 by means of screws or bolts 9 which bracket is adapted to support at its outer end a tubular housing 11. The housing 11 is provided with an axial bore 13. The lower end of bore 13 is lined with a tubular member 15, preferably of fibre or other insulating material which gives off a gas when acted upon by an arc which is suitable to aid in extinguishing an arc. To the upper end of tubular member 15 is screw-threaded a tubular member 17 of conducting material. The member 17 is extended upwardly through and beyond the housing 11 and is provided with a threaded portion to which the internally threaded collar 19 may be applied. The lowermost portion of the bore 13 of the housing 11 is provided with an annular recess 21 for receiving a flanged end portion 23 of the tubular member 15. A gasket 25 of suitable material such as cork is interposed between the collar 19 and the upper face of the housing 11 to permit the collar 19 to be drawn tightly against the gasket so as to maintain the tubular members 15 and 17 rigidly within the bore 13 of the housing 11.

The portion of the tubular member 17 designated at 27 is preferably of the same internal diameter at its lower end as the internal diameter of the tube 15. The portion 27 serves as one of the fixed contacts of the interrupter. The portion of the tube 17 above the contact 27 is of slightly greater diameter and provides a guide passage for a plunger 29. The plunger 29 has a diameter slightly less than the opening through the contact 27 and the bore of the tube 15. The upper portion of plunger 29 is provided with a flange 31 of a diameter slightly less than the bore of the tube 17. The plunger 29 is maintained within the bore of the tube 17 by means of a cap 33 screw-threaded onto the end of the tube. A compression spring 35 disposed within the bore 37 of the plunger 29, having one of its ends in engagement with the cap 33, urges the plunger 29 towards the passage in the tubular member 15.

The plunger 29 is normally maintained in the position shown in Fig. 1 by a movable contact member generally designated at 39. The movable contact member 39 in this instance comprises a rod-like body portion 41 and a blade member 43 preferably of semi-circular section, which terminates in a slightly enlarged generally semi-spherical contact portion 44. The blade 43 extends upwardly into engagement with the lower end of the plunger 29. The movable contact structure also includes a blade member 45 having a contact portion 46 and which has a configuration similar to that of blade 43, but which is not integrally secured to the body portion 41 of the movable contact member. Blade 45, on the other hand, is pivotally coupled to the blade 43 by a link 47. This link 47, as more clearly shown in Figs. 3 and 4, is operatively pivoted at its ends within opposed transverse grooves or slots 49 and 51 provided, respectively, in the blades 43 and 45. The pivotal connections of the blades 43 and 45 to the link 47 may be made by pins 53.

From the foregoing description it will be apparent that blade 45 has a limited amount of longitudinal movement with respect to its companion blade 43. It also is clearly apparent that as blade 45 is moved longitudinally with respect to blade 43 it will be displaced laterally toward and from the blade 43 depending, of course, upon the direction of longitudinal movement.

As shown in Figs. 1, 3 and 4, the blades are in a relative position so that their upper ends are in alignment for which position the link 47 extends transversely with respect to the longitudinal axis of the blades, thereby determining the position of maximum lateral displacement of these two blades. The position of maximum lateral displacement of the blades 43 and 45 is preferably the closed position of the contact member 39 and in this position the contacts 44 and 46 of the blades 43 and 45 are adapted to make high pressure engagement with the fixed contact 27.

The lower ends of the blades 43 and 45 are likewise adapted for high pressure engagement with a constricted throat portion 55 of a tubular contact 57. The contact 57 is preferably of hollow or tubular form in which the bore 59 serves as a guide for the main body portion 41 of the contact member 39. The upper end of the body portion 41 is provided with a flange or collar 61 which is adapted to engage the restricted portion 55, thereby serving as a stop to limit the upward travel of the contact member 39. Travel of the contact member 39 in the downward direction is limited by a threaded cap 63 screw-threaded onto the lower end of tubular contact 57, cap 63 in this instance being provided with a suitable aperture to allow the body portion 41 of contact member 39 to move freely thereto. The lower end of the body portion 41 may be provided with a ring member 65 or other suitable engaging means in which a hook stick may be inserted for actuating the contact member to open and closed positions. The contact 57 may be secured to an insulator 67 which, in turn, is mounted as by means of screws or bolts 69 to the base 5.

The tubular electrode 57 is also provided with a terminal 71 which serves as one of the line terminals for the interrupter. The other line terminal of the interrupter may have the form of a plate as shown at 73 which is held in contacting engagement with the collar 19 by means of a similar collar 75 screw-threaded onto the end of the tubular member 17.

When the movable contact member 39 is in the closed circuit position as shown in Fig. 1, the circuit through the interrupter proceeds from the terminal 73 to the tubular member 17, the fixed contact 27, the blades 43 and 45, tubular member 57 and terminal 71. In opening the interrupter, the movable contact member 39 is actuated downwardly by applying a force at the ring 65. During the initial stage of the opening movement, the friction holding blade 45 will cause the blade 43 to be moved independently of the blade 45 due to the pivotal connection through the link 47 between these blades. As previously explained, the resulting relative longitudinal movement between the blades 43 and 45 will cause them to collapse, thereby relieving the high pressure engagement between the contacts 44 and 46 of the blades and the contact 27 and also the high pressure engagement between the lower ends of the blade and the restricted throat portion 55 of the contact 57. This relative longitudinal movement between the blades 43 and 45 is augmented by a coil compression spring 77 interposed between the body portion 41 and the lower end of blade 45. The ends of spring 77 are preferably seated in recesses 79 and 81 provided, respectively, in the members 41 and 45. It will therefore be apparent that upon the release of the contact pressure between the upper ends of the blades 43 and 45 with the contact 27 and also the release from the contact pressure between the lower ends of these blades with the contact 57, the spring 77 will maintain the blades 43 and 45 in the collapsed position. In this position the contact member 39 is free to be withdrawn from the passage of the tubular member 15. In the event that the interrupter is carrying load during such withdrawal, an arc will be formed between the contacts 44 and 46 and the contact 27. As the blades 43 and 45 are withdrawn from the passage in the member 15, the coil spring 35 causes the plunger 29 to follow and thereby substantially closes the passage through the tube 15.

The action of the plunger 29 moving into the passage of the tube 15 causes the arc drawn within the passage to be greatly restricted and in this restricted condition the arc is forced to intimately engage the walls of the tube 15 as well as the outer surface of the plunger 29. Inasmuch as these respective surfaces are formed of a material which readily evolves arc extinguishing gas, the arc is subjected to a longitudinal blast of the gas and extinguished thereby. Upon the continued movement of the contact member 39 to the open position, as shown in Fig. 2, the plunger 29 comes to rest with its upper collar 31 in engagement with the shoulder formed by the contact 27. In this position, the lower end of the plunger 29 projects somewhat beyond the lower opening in the tubular member 15.

The upper ends of the blades 43 and 45, when the movable contact member 39 is moved to the full open position, are separated from the moving plunger 29 and any of the other parts included within the housing 11 by a distance sufficient to withstand the voltage impressed upon the terminals 71 and 73 without danger of flashover.

In order to prevent arcing between the blades 43 and 45 and the restricted opening 55 of the contact 57, there is provided a spring pressed contact 83 which may be secured to the upper end of contact 57 by means of a screw 85. Thus the contact 83 maintains the blades 43 and 45 in mechanical and electrical engagement with the contact 57 throughout the movement of the moving contact.

In closing the interrupter, the movable contact 39 is actuated upwardly and during this movement the blade 45 first engages the lower end of the plunger 29 and carries the plunger upwardly until it reaches the stop provided by the cap 33. The tension of spring 77 is such that it will maintain the blades 43 and 45 in the collapsed position during the initial upward movement of the contact member 39 during which movement the tension of spring 35 must be overcome. As soon as the plunger 29 reaches the limit of its travel in the upward direction, additional movement of the contact member 39 brings about the longitudinal alignment of the blades 43 and 45 as they are firmly urged against the lower end of the plunger 29. Thus the relative longitudinal movement between these blades due to the action of the coupling link 47 causes the lateral displacement of the blades so that their respective contacts 44 and 46 are forcefully brought into engagement with the contact 27 and their lower ends are caused to firmly engage the contact 55. This high pressure engagement is sufficient to maintain the moving contact member 39 in the closed position against the force of gravity and the tension of the spring 39 tending to urge the plunger 29 against the upper ends of the blade members 43 and 45.

In order to protect the contacts 44 and 46 of the blade members 43 and 45, as well as the upper end of the contact 57, from rain, snow, ice and sleet, when the interrupter is in the open position, the lower portion of the housing 11 is provided with a substantially semi-spherically shaped shield 87. The shield 87 is so dimensioned that its lower edge terminates somewhat below the contacts 44 and 46 and so proportioned to provide an air gap between the contacts and the inner surface of the shield sufficient to withstand high voltage. The danger of flashover on account of moisture is thereby minimized and the contacts are kept free of ice so as to be readily operable to open and closed positions.

Although there has been shown and described a specific arc extinguishing device having a particular arc extinguishing structure and a contact arrangement which is manually operative, it is to be understood that the same is for the purpose of illustration and that changes may be made by those skilled in the art, as, for example, the contact structure may be made operative automatically upon overload or it may be made automatically reclosing, or a plurality of devices of the type herein disclosed may be coupled for gang operation so as to constitute a multiple pole structure, which may be actuated to opened and closed positions in any of the ways above mentioned without departing from the spirit and scope of the appended claims.

The invention claimed is:

1. In a circuit interrupter, means defining an elongated arc passage, a fixed contact within said arc passage, a contact member movable longitudinally of said passage to open and closed positions, said contact member comprising a pair of elongated blade elements, said blade elements being adapted for relative longitudinal movement with respect to each other, and means responsive to said relative longitudinal movement for causing said blade elements to be moved laterally toward and away from each other, said last named means causing said blade elements to be moved into high pressure engagement with said fixed contact during the final movement of said contact member to the closed position.

2. In a circuit interrupter, means defining an elongated arc passage, a fixed contact within said arc passage, a contact member movable longitudinally of said passage to open and closed positions, said contact member comprising a pair of elongated blade elements, said blade elements being adapted for relative longitudinal movement with respect to each other, and means responsive to said relative longitudinal movement for causing said blade elements to be moved laterally toward and away from each other, said last named means causing said blade elements to be moved into high pressure engagement with said fixed contact during the final movement of said contact member to the closed position, and means biasing one of said blade elements longitudinally in a direction to cause said element to move toward said other element in response to movement of said contact member to the open position.

3. In a circuit interrupter, means defining an elongated arc passage, a fixed contact within said arc passage, a contact member movable longitudinally of said passage to open and closed positions, said contact member comprising a pair of elongated blade elements, a coupling link joining said blade elements to provide relative longitudinal movement therebetween, said coupling link causing said blade elements to be moved laterally apart into high pressure engagement with said fixed contact in response to the final movement of said contact member to the closed position, and biasing means for causing said coupling link to move said blade elements toward each other in response to movement of said contact member to the open position.

4. In a circuit interrupter, means defining an elongated arc passage closed at one end, a hollow fixed contact within said passage, a tubular contact disposed in fixed spaced relation with respect to said hollow contact and a movable contact member for bridging said contacts and means for moving said contact member through said tubular contact longitudinally of said passage to opened and closed positions, said contact member having expansible contact portions adapted to be moved into high pressure engagement with said fixed contacts in response to the final movement of said contact member into engagement with the closed end of said passage.

5. In a circuit interrupter, a pair of fixed tubular contacts disposed in spaced axial alinement, an arc chamber disposed about at least one of said contacts, a movable contact member for bridging said contacts, said contact member comprising a pair of blade elements having relative longitudinal movement with respect to each other and adapted for joint longitudinal movement through said tubular contacts to make and to break the circuit therebetween, means responsive to said relative longitudinal movement for moving said blade elements laterally with respect to each other, said last named means being operative during the final closing movement of said contact member to move said blade elements apart and into high pressure engagement with said tubular contacts.

6. In a circuit interrupter, a pair of fixed tubular contacts disposed in spaced axial alinement, an arc chamber disposed about at least one of said contacts a movable contact member for bridging said contacts, said contact member comprising a pair of blade elements having relative longitudinal movement with respect to each other and adapted for joint longitudinal movement through said tubular contacts to make and break the circuit therebetween, means responsive to said relative longitudinal movement for moving said blade elements laterally with respect to each other, said last named means being operative during the final closing movement of said contact member to move said blade elements apart and into high pressure engagement with said tubular contacts, and means biasing said blade elements longitudinally with respect to each other to normally cause said last named means to move said blade elements toward each other in response to movement of said contact member to the open position.

7. In a circuit interrupter, means defining an elongated arc passage, a fixed contact within said arc passage, a contact member movable longitudinally of said passage to opened and closed positions, a plunger at least partially of insulating material normally outside said passage and movable in engagement with said contact member into the passage following the withdrawal of said contact member, said contact member having an expansible contact portion and means cooperating with said plunger and operative during the final movement of said contact member to the closed position for actuating said expansible contact portion into high pressure engagement with said fixed contact.

8. In a circuit interrupter, means defining an elongated arc passage, a fixed contact within said arc passage, a contact member movable longitudinally of said passage to opened and closed positions, a plunger at least partially of insulating material, means biasing said plunger into said passage, said plunger being maintained outside said passage by said contact member when the latter is in the closed position, said contact member comprising a pair of blade elements movable longitudinally relative to each other, coupling means operative in response to said relative longitudinal movement for displacing said blade elements laterally with respect to each other, biasing means normally operative for maintaining a predetermined longitudinal and lateral displacement of said elements, said blade elements being adapted to be actuated into engagement with said plunger during the closing movement of said contact member to bring said elements longitudinally into alinement for causing said coupling means to displace said elements laterally into high pressure engagement with said fixed contact.

9. In a circuit interrupter, means defining an elongated arc passage, a fixed contact adjacent one end of said passage, a contact member movable longitudinally of said passage into and out of engagement with said fixed contact, said contact member having an expansible contact portion normally biased to a collapsed position, a plunger at least partially of insulating material normally biased into said passage and adapted to be moved out of said passage by said movable contact member when the latter is moved to the closed position, means limiting the outward movement of said plunger and means actuated by said movement of said plunger to its limited outward position by said contact member for actuating said contact portion into high pressure engagement with said fixed contact.

10. In a circuit interrupter, means defining an elongated passage, a tubular electrode within said passage adjacent one end thereof, a plunger at least partially of insulating material movable into and out of said passage through said tubular electrode between predetermined positions, a contact member movable into and out of said passage through the other end thereof, said contact member having an expansible contact portion for engaging said tubular contact, said contact portion being normally biased to the collapsed position to permit the withdrawal of said contact member from said passage, said plunger being movable in engagement with said contact portion into the passage as the contact member is withdrawn, said contact portion remaining in the collapsed position while moving said plunger to its limited outer position, and means actuated in response to further movement of said contact member toward and against said plunger to cause said contact portion to expand into high pressure engagement with said tubular electrode.

11. In a circuit interrupter, means defining an elongated arc passage, a material along at least a portion of said passage which gives off a gas when acted upon by an arc to aid in extinguishing the arc, a fixed contact within said passage, a movable contact member having an expansible contact portion adapted to engage said fixed contact, said contact member being movable longitudinally within said passage to establish an arc therein, a member at least partially of insulating material normally maintained outside said passage by said contact member when the latter is in the closed position, means biasing said member of insulating material into the passage following the withdrawal of said contact member therefrom for constricting the arc formed by the withdrawal of said contact member, and means operative in response to a forceful engagement of said expansible contact portion with said member of insulating material at the end of the closing stroke of said contact member for actuating the contact portion thereof into high pressure engagement with said fixed contact.

12. In a circuit interrupter, a cylindrical member open at one end and closed at the other, a portion of the inner walls of said member adjacent the open end defining an arc passage and being composed of a material which gives off a gas when acted upon by an arc to aid in extinguishing the arc, a tubular contact within said cylindrical member intermediate its ends, a contact member operative through the opening of said cylindrical member into and out of engagement with said tubular contact, a plunger of insulating material of slightly less diameter than said passage normally maintained adjacent the closed end of said cylindrical member by said contact member, a spring biasing said plunger into said arc passage following the withdrawal of said contact member therefrom, said contact member comprising a pair of blades movable longitudinally with respect to each other, a link coupling said blades for varying their relative lateral displacement in response to their relative longitudinal movement, and a spring normally maintaining one of said blades at the longitudinally displaced position corresponding to minimum lateral displacement, one of said blades engaging said plunger during the closing stroke of said contact member to move said plunger against the closed end of said cylindrical member and to move said blades longitudinally into alinement for causing said link to displace said blades laterally into high pressure engagement into the inner surface of said tubular contact.

13. In a circuit interrupter, a housing of weatherproof material, a tubular member at least partially of insulating material open at one end and closed at the other disposed within said housing, a fixed contact within said tubular member, a tubular contact disposed in spaced axial alinement with said tubular member, a contact member movable longitudinally through said tubular contact into and out of engagement with said fixed contact for making and breaking the circuit between said fixed contact and said tubular contact, the portion of said contact member normally bridging said fixed and tubular contacts comprising a pair of blade elements adapted for relative longitudinal movement with respect to each other, and means joining said blade elements for causing lateral displacement thereof in response to said relative longitudinal movement, and means operative upon the completion of the closing movement of said contact member to effect a longitudinal displacement of said blade elements for causing said elements to be displaced laterally into high pressure engagement with said fixed and tubular contacts.

14. In a circuit interrupter, a base, a housing of insulating material mounted upon said base, a tubular member at least partially of insulating material within said housing for defining an arc passage, a stationary contact within said housing, said housing insulating said stationary contact from said base, a contact member movable longitudinally of said arc passage into and out of engagement with said stationary contact for making and breaking the circuit, an insulator mounted upon said base, and a terminal member carried by said insulator for supporting said contact member independently of said housing.

15. In a circuit interrupter, a base, a weatherproof housing of insulating material mounted upon said base, a stationary contact of tubular form within said housing, said housing insulating said stationary contact from said base, a tubular member of insulating material disposed in coaxial alignment with said stationary contact within said housing for defining an arc passage, a contact member movable longitudinally of said passage into and out of engagement with said stationary contact, a plunger at least partially of insulating material normally disposed outside said passage and movable through said tubular stationary contact into said passage in response to the withdrawal of said contact member from said passage, said plunger being moved out of said passage by said contact member during movement of the latter to the closed circuit position, an insulator mounted on said base, and a terminal member carried by said insulator for slidably supporting said contact member independently of said housing.

16. In a circuit interrupter, a base, a weatherproof housing of insulating material mounted upon said base, a tubular member of insulating material within said housing for defining an arc passage, a fixed contact within said housing, said housing insulating said fixed contact from said base, a cooperating contact member movable longitudinally of said passage to open and closed positions, said contact member being adapted to be completely withdrawn from said passage during the opening operation of the interrupter, an insulator mounted upon said base, and a terminal member carried by said insulator for supporting said contact member, said housing having a flanged shield portion disposed in partially surrounding and spaced relation about said terminal and contact members.

17. In a circuit interrupter, a base, a housing of insulating material, support means for mounting said housing upon said base, a tubular member at least partially of insulating material within said housing for defining an arc passage, a stationary contact within said housing, said housing insulating said stationary contact from said base, said support means including a clamping member surrounding said housing intermediate the ends of said arc passage to protect said housing against strain from pressure within said arc passage, a contact member movable longitudinally of said arc passage into and out of engagement with said stationary contact for making and breaking the circuit, an insulator mounted upon said base, and a terminal member carried by said insulator for supporting said contact member independently of said housing.

MARTHA M. SCHOFIELD.
*Administratrix of the Estate of Stanley T. Schofield, Deceased.*